(12) United States Patent
Hsien

(10) Patent No.: US 11,375,761 B2
(45) Date of Patent: Jul. 5, 2022

(54) ELECTROCHEMICAL ANTIMICROBIAL FACE MASK

(71) Applicant: Chi Chen Hsien, Sacramento, CA (US)

(72) Inventor: Chi Chen Hsien, Sacramento, CA (US)

( * ) Notice: Subject to any disclaimer, the term of this patent is extended or adjusted under 35 U.S.C. 154(b) by 0 days.

(21) Appl. No.: 17/522,119

(22) Filed: Nov. 9, 2021

(65) Prior Publication Data

US 2022/0142274 A1    May 12, 2022

Related U.S. Application Data

(60) Provisional application No. 63/136,681, filed on Jan. 13, 2021, provisional application No. 63/112,634, filed on Nov. 12, 2020.

(51) Int. Cl.
*A41D 13/11* (2006.01)
*A41D 31/30* (2019.01)
*A62B 23/02* (2006.01)

(52) U.S. Cl.
CPC ........ *A41D 13/1192* (2013.01); *A41D 31/305* (2019.02); *A62B 23/025* (2013.01); *A41D 2500/30* (2013.01)

(58) Field of Classification Search
CPC .......... A41D 13/11–1192; A41D 31/00; A41D 31/04; A41D 31/30; A41D 31/305; A41D 2500/30; A62B 18/00–06; A62B 23/00–06; A01N 59/00–26; A01N 25/34
USPC .................................................. 424/402, 404
See application file for complete search history.

(56) References Cited

U.S. PATENT DOCUMENTS

| 5,467,765 A * | 11/1995 | Maturaporn ......... A62B 23/025 |
| | | 128/206.13 |
| 2011/0132373 A1* | 6/2011 | Freriks ............... B01D 39/1692 |
| | | 55/486 |
| 2021/0316171 A1* | 10/2021 | Zhamu .................... B32B 29/02 |
| 2021/0321696 A1* | 10/2021 | Skiba ..................... D06M 11/83 |
| 2021/0379413 A1* | 12/2021 | Bagga .................. A62B 18/025 |

FOREIGN PATENT DOCUMENTS

| CN | 111528553 A | * | 8/2020 |
| KR | 20140002111 A | * | 1/2014 |

* cited by examiner

*Primary Examiner* — Michelle J Lee
(74) *Attorney, Agent, or Firm* — Silicon Valley Patent Group LLP; Thomas C. Chan

(57) ABSTRACT

Apparatuses of electrochemical antimicrobial face masks and methods for manufacturing the same are provided. In one embodiment, an electrochemical antimicrobial face mask may include an electrochemical antimicrobial section configured to inactivate microbes that are in contact with the electrochemical antimicrobial section, and a filtration section configured to provide additional protection that prevents a user from breathing in the microbes, and where the electrochemical antimicrobial section is attached to the filtration section. The electrochemical antimicrobial section may include a galvanic corrosion cell membrane configured to generate antimicrobial agents via a galvanic electrochemical reaction, a hydrophilic antimicrobial membrane configured to inactivate microbes using the antimicrobial agents, and a regeneration pad configured to supply materials to the galvanic corrosion cell membrane for generating the antimicrobial agents.

18 Claims, 10 Drawing Sheets

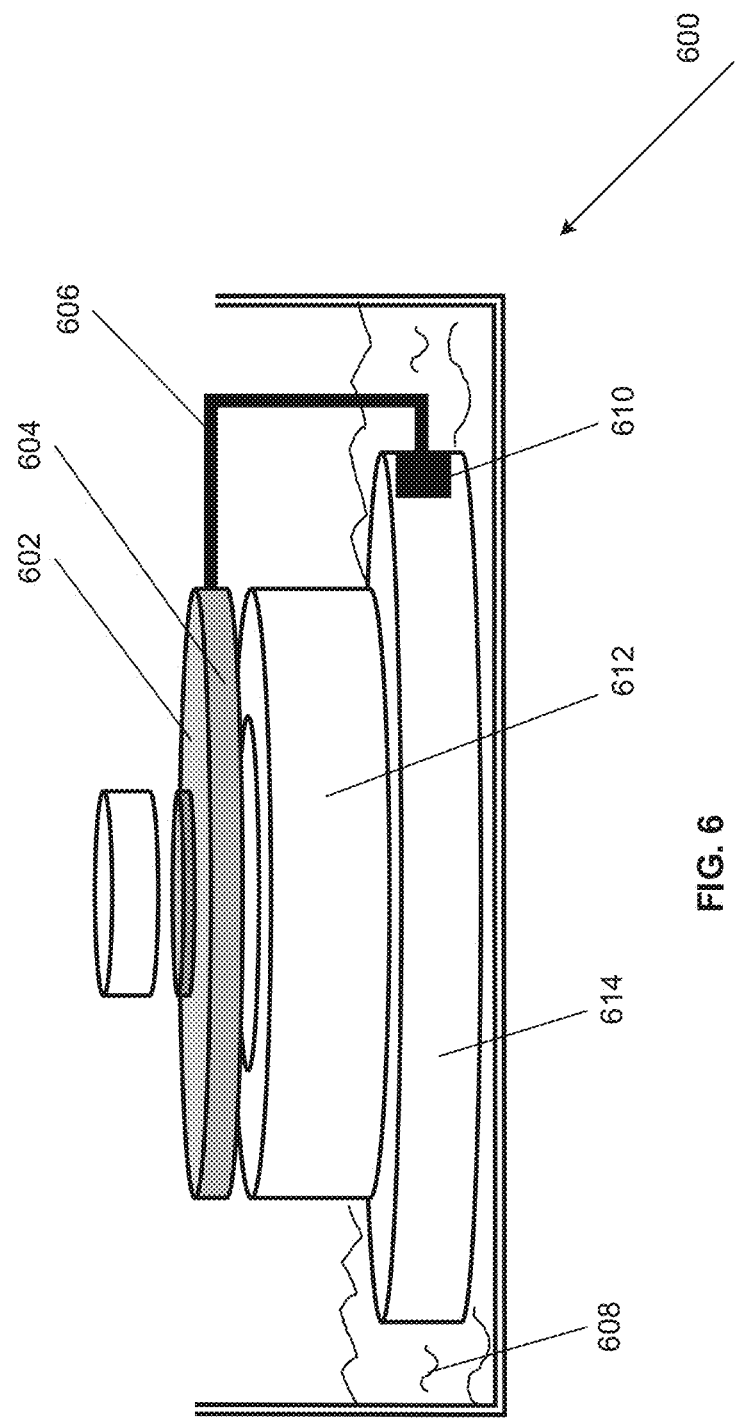

ELECTROCHEMICAL ANTIMICROBIAL FACE MASK

CROSS-REFERENCE TO RELATED APPLICATIONS

This application also claims the benefit of U.S. provisional patent application No. 63/112,634, "Detachable regenerative electrochemical antiviral membrane device respirator mask using the same and the methods for regenerating the same are provided," filed Nov. 12, 2020; and U.S. provisional patent application No. 63/136,681, "Flushable mask antiviral covering membrane and hybrid virus-killing mask," filed Jan. 13, 2021. The aforementioned United States patent applications are assigned to the assignee hereof and are hereby incorporated by reference in their entirety.

FIELD

The present invention relates to the field of face masks. In particular, the present invention relates to apparatuses of an electrochemical antimicrobial face mask and methods for manufacturing the same.

BACKGROUND

In December 2019, an outbreak of COVID-19, caused by the novel coronavirus known as SARS-CoV-2, was detected. Since then, the threat of a serious global viral pandemic has grown significantly. The need to prevent or otherwise minimize the effects of such a viral pandemic has correspondingly increased. Health experts are encouraging all people to wear a mask in places with substantial or high potential transmission of SARS-CoV-2 to prevent the spread of COVID-19. Several types of disposable and reusable face masks and respirators have been developed that may be intended to protect the users against the transfer of contagious viruses that may be suspended in the air. However, the conventional face masks and respirators still suffer from a number of drawbacks, such as: 1) the world wide shortages of medical grade face masks; 2) the waste of non-biodegradable masks have a significant environmental impact; 3) the filtering efficiency of masks is adversely affected by repeated coughing; 4) the mask becomes ideal place for virus and bacteria to thrive; 5) viruses contaminated on the surfaces of masks become an additional source of infection. 6) Virus laden droplets hitting a hydrophobic membrane of a mask may bounce off which would result in a reduced trapping of fluid (aerosols) droplets. Therefore, traditional face masks do not provide satisfactory results of preventing inflections, it is desirable to have an improved electrochemical antimicrobial face mask that can capture, inhibit and destroy microbes thereby protecting against transmission of viruses.

SUMMARY

Apparatuses of electrochemical antimicrobial face masks and methods for manufacturing the same are provided. In one embodiment, an electrochemical antimicrobial face mask may include an electrochemical antimicrobial section configured to inactivate microbes that are in contact with the electrochemical antimicrobial section, and a filtration section configured to provide additional protection that prevents a user from breathing in the microbes, and where the electrochemical antimicrobial section is attached to the filtration section. The electrochemical antimicrobial section may include a galvanic corrosion cell membrane configured to generate antimicrobial agents via a galvanic electrochemical reaction, a hydrophilic antimicrobial membrane configured to inactivate microbes using the antimicrobial agents, and a regeneration pad configured to supply materials to the galvanic corrosion cell membrane for generating the antimicrobial agents.

In another embodiment, a method of manufacturing an electrochemical antimicrobial face mask may include forming an electrochemical antimicrobial section to inactivate microbes that are in contact with the electrochemical antimicrobial section, forming a filtration section to provide additional protection that prevents a user from breathing in the microbes, where the electrochemical antimicrobial section is attached to the filtration section.

The method of forming the electrochemical antimicrobial section may include forming a galvanic corrosion cell membrane to generate antimicrobial agents via a galvanic electrochemical reaction, forming a hydrophilic antimicrobial membrane to inactivate microbes using the antimicrobial agents, and forming a regeneration pad to supply materials to the galvanic corrosion cell membrane for generating the antimicrobial agents, where the antimicrobial agents are maintained in a range between 1 ppm to 10 ppm.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the specification.

FIG. 6 illustrates a side view of a device for restoring an electrochemical antimicrobial face mask according to aspects of the present disclosure.

DESCRIPTION OF EMBODIMENTS

Apparatuses of electrochemical antimicrobial face masks and methods for manufacturing the same are provided. The following descriptions are presented to enable a person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Figure 1:
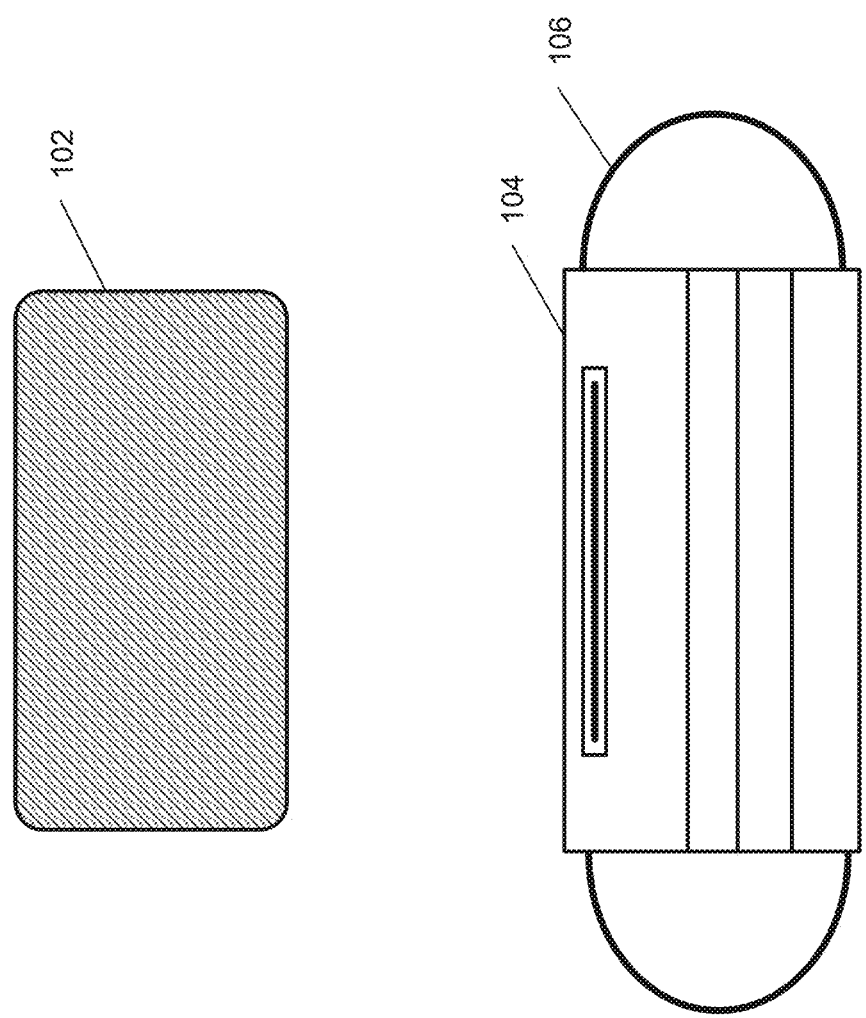
FIG. 1 illustrates a front view of an electrochemical antimicrobial face mask according to aspects of the present disclosure.

FIG. 1 illustrates a front view of an electrochemical antimicrobial face mask according to aspects of the present disclosure. In the example shown in FIG. 1, the electrochemical antimicrobial face mask an electrochemical antimicrobial section 102 and a filtration section 104. The electrochemical antimicrobial section 102 is configured to inactivate microbes that are in contact with the electrochemical antimicrobial section. The filtration section 104 is configured to provide additional protection that prevents a user from breathing in the microbes.

According to aspects of the present disclosure, the electrochemical antimicrobial section 102 can be attached to the filtration section 104 via various methods, including but not limited to: 1) using adhesives; 2) using clips; 3) using straps; or 4) using Velcro. With these methods of attaching the electrochemical antimicrobial section 102 to the filtration section 104, these methods make the electrochemical antimicrobial section 102 detachable to the filtration section 104. In this way, each of the electrochemical antimicrobial section 102 or the filtration section 104 may be renewed or regenerated separately. For example, a device to renew or regenerate the electrochemical antimicrobial section 102 is described below in association with FIG. 6 and its descriptions. The filtration section 104 may be disinfected for reuse using alcohol spray, steam, or other means of disinfection.

Although the electrochemical antimicrobial section 102 and the filtration section 104 are shown as separate pieces in FIG. 1, in certain applications, the electrochemical antimicrobial section 102 and the filtration section 104 may be made as one piece, where one-time use may be desired.

Figure 2A:
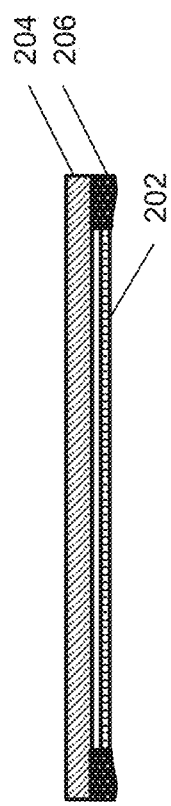
FIG. 2A illustrates a cross sectional view of an exemplary implementation of an electrochemical antimicrobial section of an electrochemical antimicrobial face mask according to aspects of the present disclosure.

FIG. 2A illustrates a cross sectional view of an exemplary implementation of an electrochemical antimicrobial section of an electrochemical antimicrobial face mask according to aspects of the present disclosure. As shown in FIG. 2A, the electrochemical antimicrobial section of an electrochemical antimicrobial face mask includes a galvanic corrosion cell membrane 202 configured to generate antimicrobial agents via a galvanic electrochemical reaction, a hydrophilic antimicrobial membrane 204 configured to inactivate microbes using the antimicrobial agents, and a regeneration pad 206 configured to supply materials to the galvanic corrosion cell membrane for generating the antimicrobial agents. In some implementations, the antimicrobial agents are maintained in a range between 1 part per million (ppm) to 10 ppm.

Figure 2B:
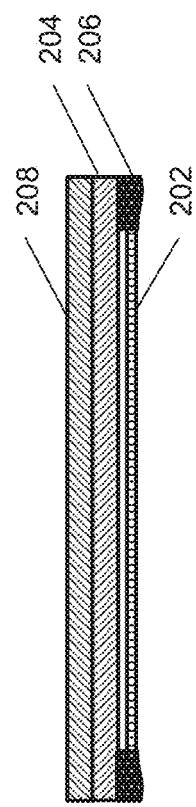
FIG. 2B illustrates a cross sectional view of another exemplary implementation of an electrochemical antimicrobial section of an electrochemical antimicrobial face mask according to aspects of the present disclosure.

FIG. 2B illustrates a cross sectional view of another exemplary implementation of an electrochemical antimicrobial section of an electrochemical antimicrobial face mask according to aspects of the present disclosure. In the exemplary implementation shown in FIG. 2B, some of the components of the electrochemical antimicrobial section of an electrochemical antimicrobial face mask are the same as the components shown in FIG. 2A, such as the galvanic corrosion cell membrane 202, the hydrophilic antimicrobial membrane 204 and the regeneration pad 206. The description of these components are not repeated here. The electrochemical antimicrobial section of an electrochemical antimicrobial face mask further includes a hydrophobic 100% spun bond polypropylene nonwoven membrane 208 configured to act as a first layer of filtering as well as protecting the hydrophilic antimicrobial membrane 204.

In some implementations, the hydrophobic 100% spun bond polypropylene nonwoven membrane 208 and the hydrophilic antimicrobial membrane 204 may be sewn along the edge of rectangle to form a set of double layered antimicrobial membranes, where the edge of the bottom surface of the double layered antimicrobial membranes may have a stretchable pocket for placing a bottom layer of electrochemical antimicrobial membrane such as the galvanic corrosion cell membrane, the generation pad into the pocket.

Figure 3A:
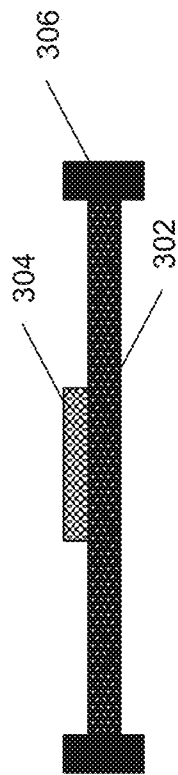
FIG. 3A illustrates a cross sectional view of an exemplary implementation of a galvanic corrosion cell membrane according to aspects of the present disclosure.

FIG. 3A illustrates a cross sectional view of an exemplary implementation of a galvanic corrosion cell membrane according to aspects of the present disclosure. As shown in FIG. 3A, a galvanic corrosion cell membrane 202 may include a porous copper foil layer 302 that function as an anode of the galvanic corrosion cell membrane 202, and a porous silver layer 304 that function as a cathode of the galvanic corrosion cell membrane 202, and a copper gasket 306 configured to function as an electrical conductor.

According to aspects of the current disclosure, the outer boundary of the porous copper foil layer 302 may be embedded in the copper gasket 306. The copper gasket 306 can be further configured to increase the durability of the electrochemical antimicrobial face mask. The porous copper foil layer 302 may have a thickness of 25 to 50 microns and may have pores in the size of 5 to 20 micrometers in diameter. The porous copper foil layer 302 can be formed with chemical etching.

In some implementations, the rim of the porous copper foil layer 302 can be embedded in a copper gasket 306 to enhance its strengthening and durability as well as an electric conductor. A 3 cm round shape, porous silver layer 304 may plate on the middle section of the top surface of the porous copper foil layer which may form a Cu anode-Ag cathode galvanic cell. In applications where the electrochemical antimicrobial section may place into the stretchable pocket which located at the bottom surface of the double layered electrochemical antimicrobial membrane, the galvanic corrosion cell membrane 202 may be configured to process a galvanic electrochemical reaction for generating the antimicrobial agents such as copper ions to inactivate the microbes.

Figure 3B:
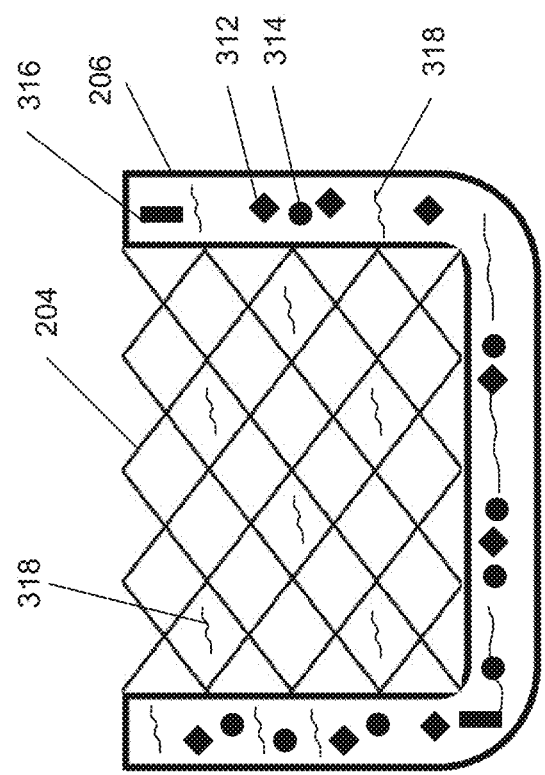
FIG. 3B illustrates a cross sectional view of an exemplary implementation of a hydrophilic antimicrobial membrane in contact with a regeneration pad according to aspects of the present disclosure.

FIG. 3B illustrates a cross sectional view of an exemplary implementation of a hydrophilic antimicrobial membrane in contact with a regeneration pad according to aspects of the present disclosure. In the example shown in FIG. 3B, a generation pad 206 may include copper foil chips 312 (represented by a black diamond) and silver coated copper foil chips 314 (represented by a black circle). The regeneration pad 206 may include a hygroscopic salt 316 (represented by a black rectangle) configured to form an electrolyte 318 (represented by wiggle lines) in the hydrophilic antimicrobial membrane 204 using moisture from exhaled air of the user, where the electrolyte 318 is drawn from the hydrophilic antimicrobial membrane 204 to the galvanic corrosion cell membrane 202 by the hygroscopic salt 316 via the regeneration pad 206. The regeneration pad 206 may further include a mixture of anodic and cathodic materials that dissolves in the electrolyte 318 to facilitate a galvanic electrochemical reaction to generate the antimicrobial agents.

The mixture of anodic and cathodic materials include at least one of the following pairs: copper foil chips and silver coated copper foil chips, micron sized copper powder and silver powder, copper fibers and silver fibers, or zinc wires and copper wires. The antimicrobial agents comprise at least one of: copper ions, silver ions, and zinc ions.

In some implementations, the generation pad 206 may be made of a 3 mm to 5 mm thick, 1 cm wide, and 15 cm to 20 cm long cotton bag which may be filled with a 2:1 weight ratio mixture of anodic and cathodic materials. The generation pad 206 may be placed into a stretchable pocket (not shown) which can be located at the bottom surface of the double layered electrochemical antimicrobial membrane. The generation pad 206 may be configured to absorb electrolyte from a wetted hydrophilic antimicrobial membrane 204 to form a Cu—Ag galvanic cell for processing a galvanic electrochemical reaction to generate antimicrobial agents such as silver ions, copper ions, or zinc ions.

According to aspects of the present disclosure, the hydrophilic antimicrobial membrane 204 may include a hydrophilic membrane made of a spun bond 65% polyester and 35% viscose nonwoven, or a hydrophilic membrane made of a spun bond 65% polyester and 35% cotton nonwoven.

Figure 4A:
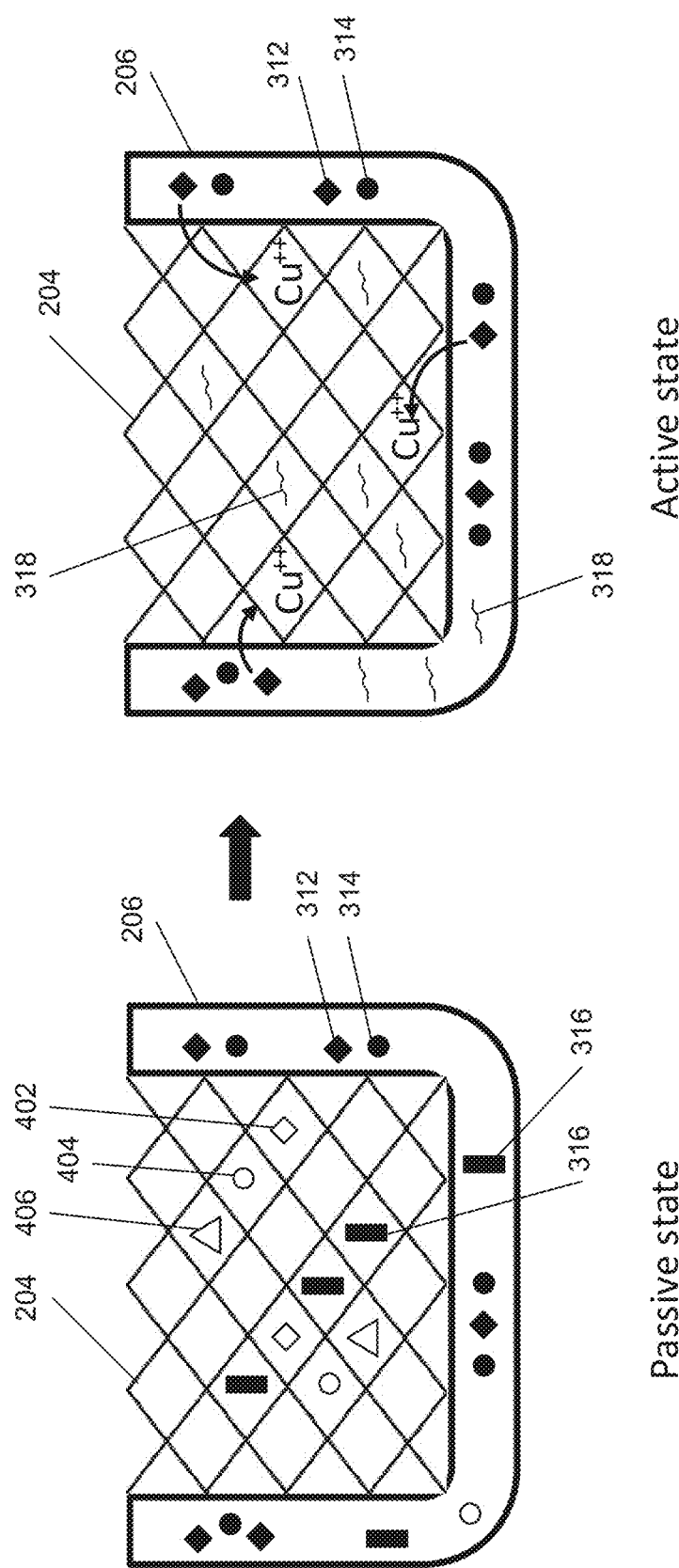
FIG. 4A illustrates an exemplary implementation of converting a hydrophilic antimicrobial membrane from a passive state to an active state according to aspects of the present disclosure.

FIG. 4A illustrates an exemplary implementation of converting a hydrophilic antimicrobial membrane from a passive state to an active state according to aspects of the present disclosure. As shown in FIG. 4A, in a passive state, the hydrophilic antimicrobial membrane 204 may include antimicrobial agents such as $AgNO_3$ 402 (represented by a white diamond), $CuCl_2$ 404 (represented by a white circle), or $ZnCl_2$ 406 (represented by a white triangle) and a hygroscopic salt 316 (represented by a black rectangle). The generation pad 206 may include copper foil chips 312 (represented by a black diamond) and silver coated copper foil chips 314 (represented by a black circle) and hygroscopic salt 316 (represented by a black rectangle), same as shown in FIG. 3B. In some applications, the electrochemical antimicrobial face mask may be stored in a portable hygiene bag which includes a hygroscopic substance to absorb moisture from the hydrophilic antimicrobial membrane 204 and the generation pad 206 in the passive state to prolong the effectiveness of electrochemical antimicrobial face mask.

According to aspects of the present disclosure, when a user put on an electrochemical antimicrobial face mask, the hydrophilic antimicrobial membrane 204 and the generation pad 206 may be caused to transfer from a passive state to an active state, as the hygroscopic salt 316 in the hydrophilic antimicrobial membrane 204 can capture moisture from a user's exhaled air to form an electrolyte 318, which can include antimicrobial agents and hygroscopic salt on the surface of the fibers of the hydrophilic antimicrobial membrane 204. The electrolyte 318 on the hydrophilic antimicrobial membrane 204 can capture and moisturize airborne microbes into droplets. In the process, the hydrophilic antimicrobial membrane 204 can consume an amount of antimicrobial agent, such as $AgNO_3$ 402, $CuCl_2$ 404 (shown as $Cu^{++}$), or $ZnCl_2$.

Note that the regeneration pad 206 is employed to maintain the hydrophilic antimicrobial membrane 204 to have a steady amount of antimicrobial agent in the range between 1 ppm to 10 ppm in order to effectively inactivate microbes. The galvanic corrosion cell membrane 202 is caused to undergo a copper—silver galvanic electrochemical reaction to generate the steady amount of antimicrobial agent, such as copper ions in the range between 1 ppm to 10 ppm, to maintain the function of the hydrophilic antimicrobial membrane 204 to have antimicrobial capabilities.

Figure 4B:
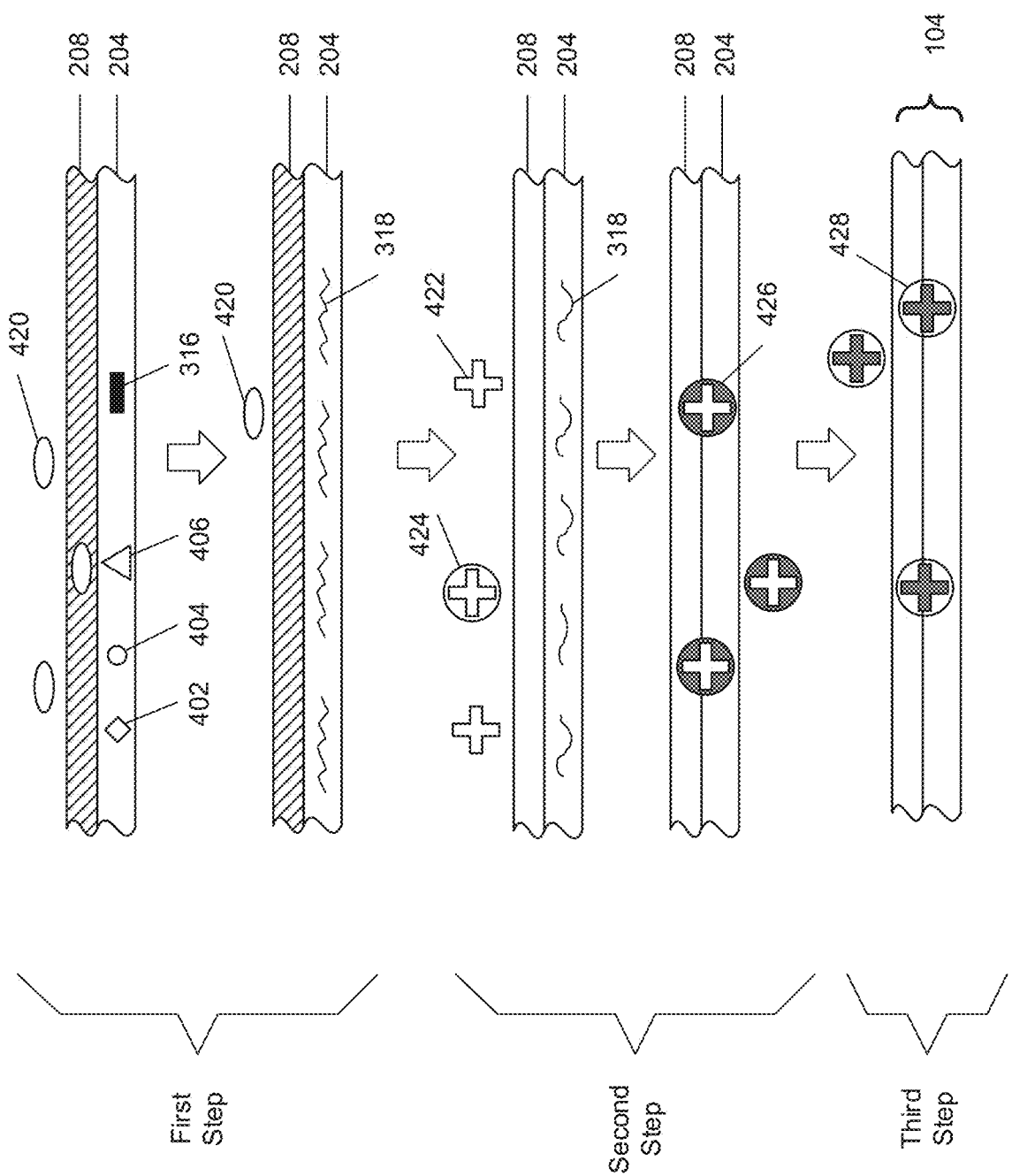
FIG. 4B illustrates a process of inactivating microbes by an electrochemical antimicrobial face mask according to aspects of the present disclosure.

FIG. 4B illustrates a process of inactivating microbes by an electrochemical antimicrobial face mask according to aspects of the present disclosure. The following three steps illustrate an exemplary operating process of the electrochemical antimicrobial face mask.

First step: a hydrophilic antimicrobial membrane 204 may include antimicrobial agents such as $AgNO_3$ 402, $CuCl_2$ 404, $ZnCl_2$ 406 and hygroscopic salt 316 for building the antimicrobial capabilities. The hygroscopic salt 316 having a critical relative humidity value of 75% may naturally capture moisture 420 from a user's exhale air to form an electrolyte 318 on the surface of fibers of the hydrophilic antimicrobial membrane 204. In applications where the electrolyte 318 may include antimicrobial agents such as silver ions, copper ions, zinc ions configured to inactivate microbes.

Second step: In applications when the airborne microbe-laden aerosol or droplets in contact with the antimicrobial membrane where the electrolyte 318 on a hydrophilic antimicrobial membrane 204 may have an affinity to react with microbes especially with microbes-laid aerosol 422 and droplets 424, then the electrolyte 318 may moisturize the airborne microbes into droplets 426 that include both of antimicrobial agents and microbes.

The generation pad 206 may include copper foil chips as anode, silver coated copper foil chips as cathode and the electrolyte 318 may cause the galvanic corrosion cell membrane 202 for processing an electrochemical reaction to generate copper ions and nano-size silver particles for maintaining an antimicrobial capabilities in the hydrophilic antimicrobial membrane 204 to inactivate microbes.

Third step: A face mask such as a reusable filtration type face mask comprises a set of double layered hydrophobic filtration membranes which includes a top membrane layer and a bottom membrane layer that may be configured to prevent droplets to pass through the membrane. The filtration type face mask may capture the droplets 426 which may include both of microbes and antimicrobial agents, where the antimicrobial agents cause the microbes in droplets 426 to become inactivated microbes in droplets 428.

According to aspects of the present disclosure, the electrochemical antimicrobial face mask may possess additional features/benefits such as: 1) the electrochemical antimicrobial face mask may protect the filtration type face mask by avoiding active microbes to be in contact with face mask, 2) the electrochemical antimicrobial face mask can inactivate the exhale microbes to prevent active microbes from a user to escape into air. 3) The electrochemical antimicrobial face mask may form a galvanic corrosion cell membrane, such as a Cu—Ag galvanic cell, which includes a copper anode (with standard reduction potential ±0.34 V) and a silver cathode (with standard reduction potential 0.799 V). The standard reduction potential of a Cu—Ag galvanic cell can be +0.46 V. The positive potential value of the galvanic cell may correspond to a negative value of Gibbs free energy, and a negative ΔG indicates that the galvanic corrosion reaction can form a spontaneous reaction. Therefore, a spontaneous Cu—Ag electrochemical reaction may occur to generate antimicrobial agents, such as copper ions, micron to nano size silver particles, for maintaining antimicrobial capabilities in the hydrophilic antimicrobial membrane.

Figure 5A:
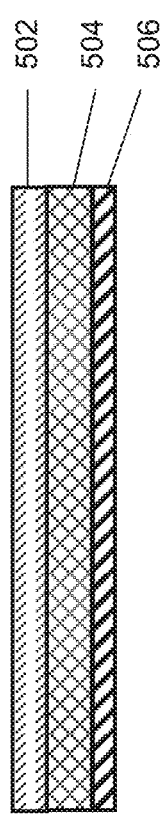
FIG. 5A illustrates an exemplary implementation of a filtration section of an electrochemical antimicrobial face mask according to aspects of the present disclosure.

FIG. 5A illustrates an exemplary implementation of a filtration section of an electrochemical antimicrobial face mask according to aspects of the present disclosure. In the example shown in FIG. 5A, a filtration section of an electrochemical antimicrobial face mask may include a polytetrafluoroethylene membrane 502 configured to perform a fine filtration of microbes and particles in the air, where the polytetrafluoroethylene membrane may have a pore size in the range of 0.3 to 5 micron, a hydrophilic filtration membrane 506 configured to provide comfort when touching the user's skin, and a holder 504 configured to hold the electrochemical antimicrobial section in place.

Figure 5B:
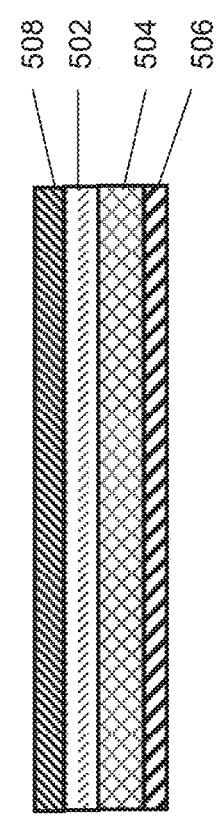
FIG. 5B illustrates another exemplary implementation of a filtration section of an electrochemical antimicrobial face mask according to aspects of the present disclosure.

FIG. 5B illustrates another exemplary implementation of a filtration section of an electrochemical antimicrobial face mask according to aspects of the present disclosure. In FIG. 5B, components such as the polytetrafluoroethylene membrane 502, the holder 504, and the hydrophilic filtration membrane 506 are the same as that in FIG. 5A. The description of these components are skipped here for simplicity. The filtration section of an electrochemical antimicrobial face mask further includes a spun bond polypropylene membrane 508 configured to perform a coarse filtration of microbes and particles in the air, where the spun bond polypropylene membrane 508 has a weight density of 25 to 40 g/m2.

Figure 5C:
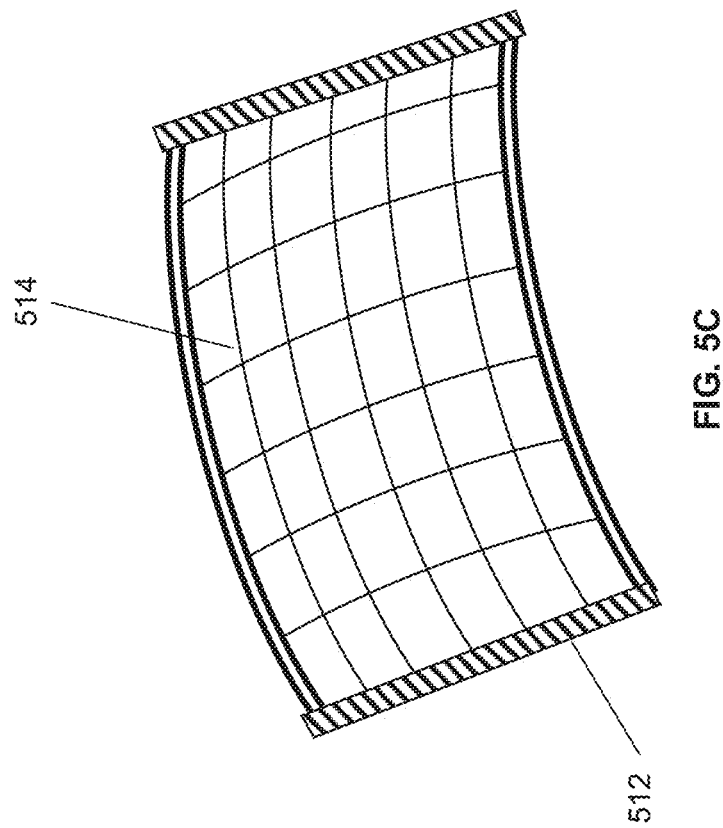
FIG. 5C illustrates implementations of a holder of the filtration section of an electrochemical antimicrobial face mask according to aspects of the present disclosure.

FIG. 5C illustrates implementations of a holder of the filtration section of an electrochemical antimicrobial face mask according to aspects of the present disclosure. As shown in FIG. 5C, the upper portion of the holder 504 may be made of glass fiber reinforced silicone rubber 514 to enhance its strength and durability. The boundary of the holder 504 may include a silicone rubber sealing pad 512, attached to the outer boundary of the filtration section. The silicone rubber sealing pad 512 is configured to fit the contour of the user's face and to minimize air leakage at the edges of the electrochemical antimicrobial face mask. In some implementations, the filtration section of an electrochemical antimicrobial face mask may include a commercially available N95 face mask, or a commercially available surgical face mask.

FIG. 6 illustrates a side view of a device for restoring an electrochemical antimicrobial face mask according to aspects of the present disclosure. As shown in FIG. 6, an electrochemical antimicrobial membrane regeneration device 600 may include a Zn—Cu galvanic cell 606, plating electrolyte 604 and electrical connector 610. The Zn—Cu galvanic cell may comprise a micro-pore copper foil electrochemical antimicrobial membrane 602, a sponge 612 soaked with a plating electrolyte 608 which includes copper chloride and hygroscopic salt and a sacrificial zinc block 614 soaked in the plating electrolyte 608. When the copper gasket 306 of a micro-pore copper foil electrochemical antimicrobial membrane connects with the electrical contact 610 of the sacrificial zinc block 614 may initiate a galvanic corrosion reaction, where the sacrificial zinc block may oxidize into $Zn^{2+}$ ions and releasing electrons which may be used to reduce copper ions into copper which may plate onto the surface of the micro-pore copper foil for regenerating the micro-size copper foil electrochemical antimicrobial membrane.

Figure 7A:
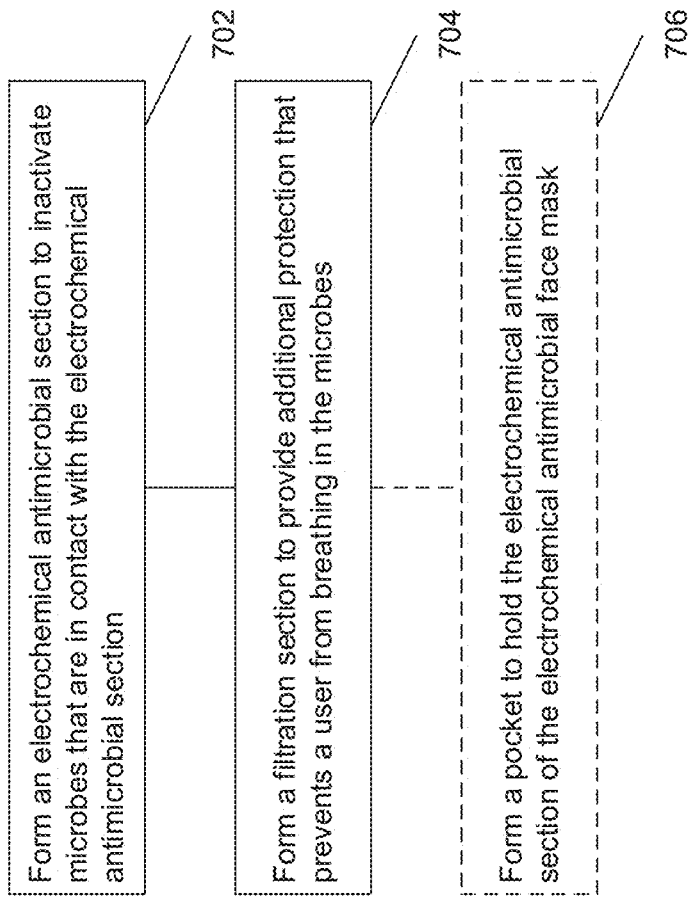
FIG. 7A illustrates a method of manufacturing an electrochemical antimicrobial face mask according to aspects of the present disclosure.

FIG. 7A illustrates a method of manufacturing an electrochemical antimicrobial face mask according to aspects of the present disclosure. In the exemplary method of FIG. 7A, in block 702, the method forms an electrochemical antimicrobial section to inactivate microbes that are in contact with the electrochemical antimicrobial section. In block 704, the method forms a filtration section to provide additional protection that prevents a user from breathing in the microbes.

According to aspects of the present disclosure, the electrochemical antimicrobial section can be attached to the filtration section. The methods performed in block 702 and block 704 may additionally/optionally include the methods performed in block 706. In block 706, the method forms a pocket to hold the electrochemical antimicrobial section of the electrochemical antimicrobial face mask.

Figure 7B:
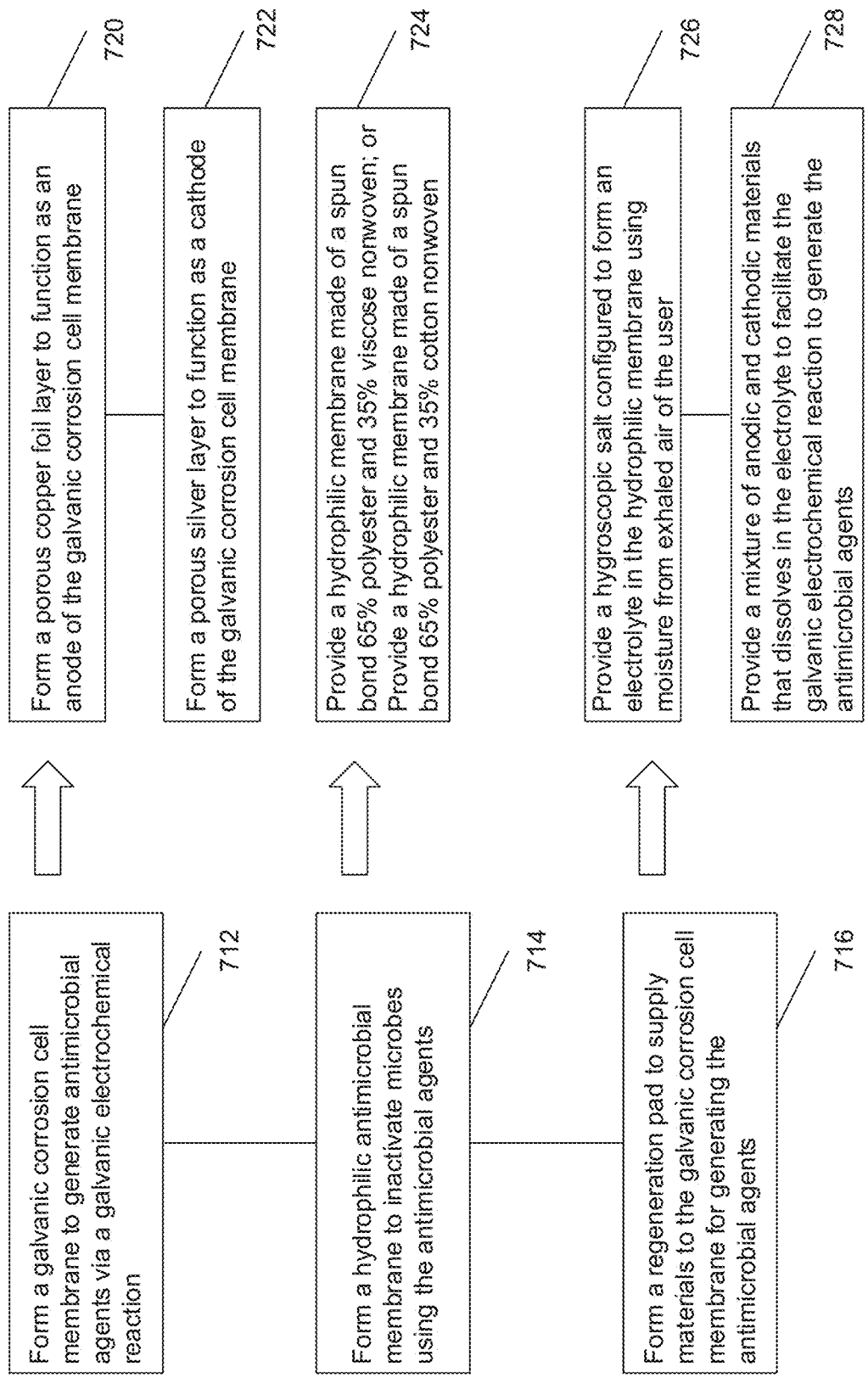
FIG. 7B illustrates a method of forming the electrochemical antimicrobial section of the electrochemical antimicrobial face mask of FIG. 7A according to aspects of the present disclosure.

FIG. 7B illustrates a method of forming the electrochemical antimicrobial section of the electrochemical antimicrobial face mask of FIG. 7A according to aspects of the present disclosure. As shown in FIG. 7B, in block 712, the method forms a galvanic corrosion cell membrane to generate antimicrobial agents via a galvanic electrochemical reaction. In block 714 the method forms a hydrophilic antimicrobial membrane to inactivate microbes using the antimicrobial agents. In block 716, the method forms a regeneration pad to supply materials to the galvanic corrosion cell membrane for generating the antimicrobial agents, where the antimicrobial agents are maintained in a range between 1 ppm to 10 ppm.

According to aspects of the present disclosure, the methods performed in block 712 may further include the methods performed in block 720 and block 722. In block 720, the method forms a porous copper foil layer to function as an anode of the galvanic corrosion cell membrane. In block 722, the method forms a porous silver layer to function as a cathode of the galvanic corrosion cell membrane.

In some implementations, the porous copper foil layer has a thickness of 25 to 50 microns and has pores in the size of 5 to 20 micrometers in diameter; and the porous copper foil layer is formed with chemical etching. The outer boundary of the porous copper foil layer is embedded in a copper gasket configured to function as an electric conductor and the copper gasket is further configured to increase the durability of the electrochemical antimicrobial face mask.

According to aspects of the present disclosure, the methods performed in block 714 may further include the methods performed in block 724. In block 724, the method provides a hydrophilic membrane made of a spun bond 65% polyester and 35% viscose nonwoven, or provides a hydrophilic membrane made of a spun bond 65% polyester and 35% cotton nonwoven.

According to aspects of the present disclosure, the methods performed in block 716 may further include the methods performed in block 726 and block 728. In block 726, the method provides a hygroscopic salt configured to form an electrolyte in the hydrophilic membrane using moisture from exhaled air of the user, where the electrolyte is drawn from the hydrophilic antimicrobial membrane to the galvanic corrosion cell membrane by the hygroscopic salt via the regeneration pad. In block 728, the method provides a mixture of anodic and cathodic materials that dissolves in the electrolyte to facilitate the galvanic electrochemical reaction to generate the antimicrobial agents.

In some implementations, the mixture of anodic and cathodic materials can include at least one of the following pairs: copper foil chips and silver coated copper foil chips, micron sized copper powder and silver powder, copper fibers and silver fibers, or zinc wires or copper wires. The antimicrobial agents can include at least one of: copper ions, silver ions, and zinc ions.

Figure 7C:
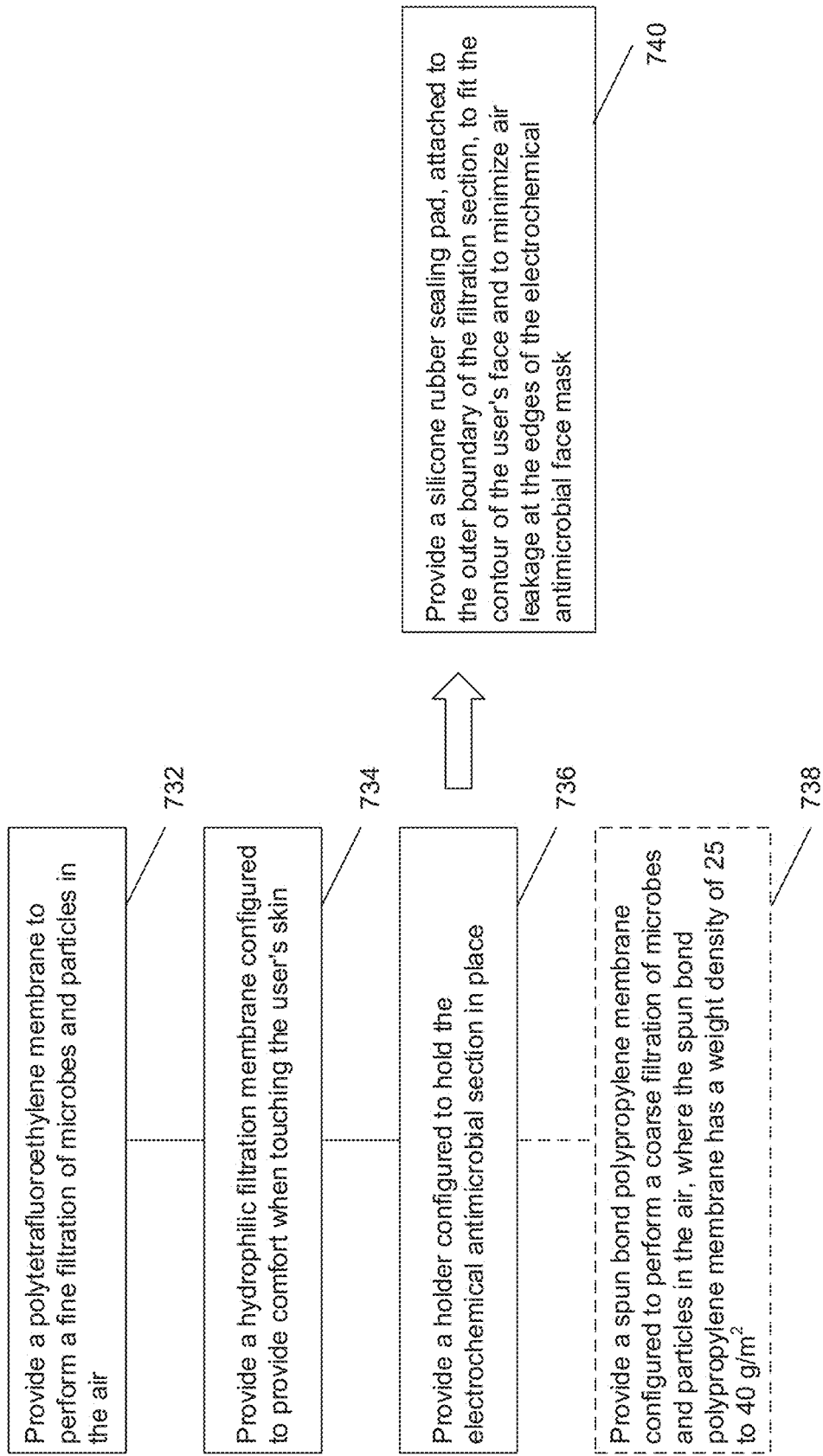
FIG. 7C illustrates a method of forming the filtration section of the electrochemical antimicrobial face mask of FIG. 7A according to aspects of the present disclosure.

FIG. 7C illustrates a method of forming the filtration section of the electrochemical antimicrobial face mask of FIG. 7A according to aspects of the present disclosure. As shown in the exemplary method of FIG. 7C, in block 732, the method provides a polytetrafluoroethylene membrane to perform a fine filtration of microbes and particles in the air, where the polytetrafluoroethylene membrane has a pore size in the range of 0.3 to 5 micron. In block 734, the method provides a hydrophilic filtration membrane configured to provide comfort when touching the user's skin. In block 736, the method provides a holder configured to hold the electrochemical antimicrobial section in place.

According to aspects of the present disclosure, the methods performed in blocks 732 through 736 may additionally/optionally include the methods performed in block 738. In block 738, the method provides a spun bond polypropylene membrane configured to perform a coarse filtration of microbes and particles in the air, where the spun bond polypropylene membrane has a weight density of 25 to 40 g/m². The methods performed in block 736 may further include the methods performed in block 740. In block 740, the method provides a silicone rubber sealing pad, attached to the outer boundary of the filtration section, to fit the contour of the user's face and to minimize air leakage at the edges of the electrochemical antimicrobial face mask.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. An electrochemical antimicrobial face mask, comprising:
   an electrochemical antimicrobial section configured to inactivate microbes that are in contact with the electrochemical antimicrobial section, comprising a galvanic corrosion cell membrane configured to generate antimicrobial agents via a galvanic electrochemical reaction, a hydrophilic antimicrobial membrane configured to inactivate microbes using the antimicrobial agents, and a regeneration pad configured to supply materials to the galvanic corrosion cell membrane for generating the antimicrobial agents, wherein the antimicrobial agents are maintained in a range between 1 ppm to 10 ppm;
   a filtration section configured to provide additional protection that prevents a user from breathing in the microbes; and
   wherein the electrochemical antimicrobial section is attached to the filtration section.

2. The electrochemical antimicrobial face mask of claim 1, wherein the filtration section comprises:
   a polytetrafluoroethylene membrane configured to perform a fine filtration of microbes and particles in the air, wherein the polytetrafluoroethylene membrane has a pore size in the range of 0.3 to 5 micron;
   a hydrophilic filtration membrane configured to provide comfort when touching the user's skin; and
   a holder configured to hold the electrochemical antimicrobial section in place.

3. The electrochemical antimicrobial face mask of claim 2, wherein the filtration section further comprises:
   a spun bond polypropylene membrane configured to perform a coarse filtration of microbes and particles in the air, wherein the spun bond polypropylene membrane has a weight density of 25 to 40 g/m².

4. The electrochemical antimicrobial face mask of claim 2, wherein the holder comprises:
   a silicone rubber sealing pad, attached to an outer boundary of the filtration section, configured to fit a contour of the user's face and to minimize air leakage at edges of the electrochemical antimicrobial face mask.

5. The electrochemical antimicrobial face mask of claim 1, wherein the regeneration pad comprises:
   a hygroscopic salt configured to form an electrolyte in the hydrophilic membrane using moisture from exhaled air of the user, wherein the electrolyte is drawn from the hydrophilic antimicrobial membrane to the galvanic corrosion cell membrane by the hygroscopic salt via the regeneration pad; and
   a mixture of anodic and cathodic materials that dissolves in the electrolyte to facilitate the galvanic electrochemical reaction to generate the antimicrobial agents.

6. The electrochemical antimicrobial face mask of claim 5, wherein the mixture of anodic and cathodic materials comprise at least one of the following pairs:
   copper foil chips and silver coated copper foil chips, micron sized copper powder and silver powder, copper fibers and silver fibers, or zinc wires and copper wires; and
   the antimicrobial agents comprise at least one of: copper ions, silver ions, and zinc ions.

7. The electrochemical antimicrobial face mask claim 1, wherein the galvanic corrosion cell membrane comprises:
   a porous copper foil layer that function as an anode of the galvanic corrosion cell membrane; and
   a porous silver layer that function as a cathode of the galvanic corrosion cell membrane;
   wherein the porous copper foil layer has a thickness of 25 to 50 microns and has pores in the size of 5 to 20 micrometers in diameter; and the porous copper foil layer is formed with chemical etching; and
   wherein outer boundary of the porous copper foil layer is embedded in a copper gasket configured to function as an electric conductor and the copper gasket is further configured to increase durability of the electrochemical antimicrobial face mask.

8. The electrochemical antimicrobial face mask of claim 1, wherein the hydrophilic antimicrobial membrane comprises:
- a hydrophilic membrane made of a spun bond 65% polyester and 35% viscose nonwoven; or
- a hydrophilic membrane made of a spun bond 65% polyester and 35% cotton nonwoven.

9. The electrochemical antimicrobial face mask of claim 1, wherein the filtration section comprises:
- a commercially available N95 face mask; or
- a commercially available surgical face mask.

10. A method of manufacturing an electrochemical antimicrobial face mask, comprising:
- forming an electrochemical antimicrobial section to inactivate microbes that are in contact with the electrochemical antimicrobial section, comprising forming a galvanic corrosion cell membrane to generate antimicrobial agents via a galvanic electrochemical reaction, forming a hydrophilic antimicrobial membrane to inactivate microbes using the antimicrobial agents, and forming a regeneration pad to supply materials to the galvanic corrosion cell membrane for generating the antimicrobial agents, wherein the antimicrobial agents are maintained in a range between 1 ppm to 10 ppm;
- forming a filtration section to provide additional protection that prevents a user from breathing in the microbes; and
- wherein the electrochemical antimicrobial section is attached to the filtration section.

11. The method of claim 10, wherein forming the filtration section comprises:
- providing a polytetrafluoroethylene membrane to perform a fine filtration of microbes and particles in the air, wherein the polytetrafluoroethylene membrane has a pore size in the range of 0.3 to 5 micron;
- providing a hydrophilic filtration membrane configured to provide comfort when touching the user's skin; and
- providing a holder configured to hold the electrochemical antimicrobial section in place.

12. The method of claim 11, wherein forming the filtration section further comprises:
- providing a spun bond polypropylene membrane configured to perform a coarse filtration of microbes and particles in the air, wherein the spun bond polypropylene membrane has a weight density of 25 to 40 g/m$^2$.

13. The method of claim 11, wherein providing the holder comprises:
- providing a silicone rubber sealing pad, attached to an outer boundary of the filtration section, configured to fit a contour of the user's face and to minimize air leakage at edges of the electrochemical antimicrobial face mask.

14. The method of claim 10, wherein forming the regeneration pad comprises:
- providing a hygroscopic salt configured to form an electrolyte in the hydrophilic membrane using moisture from exhaled air of the user, wherein the electrolyte is drawn from the hydrophilic antimicrobial membrane to the galvanic corrosion cell membrane by the hygroscopic salt via the regeneration pad; and
- providing a mixture of anodic and cathodic materials that dissolves in the electrolyte to facilitate the galvanic electrochemical reaction to generate the antimicrobial agents.

15. The method of claim 14, wherein the mixture of anodic and cathodic materials comprise at least one of the following pairs:
- copper foil chips and silver coated copper foil chips, micron sized copper powder and silver powder, copper fibers and silver fibers, or zinc wires and copper wires; and
- the antimicrobial agents comprise at least one of: copper ions, silver ions, and zinc ions.

16. The method of claim 10, wherein forming the galvanic corrosion cell membrane comprises:
- forming a porous copper foil layer to function as an anode of the galvanic corrosion cell membrane; and
- forming a porous silver layer to function as a cathode of the galvanic corrosion cell membrane;
- wherein the porous copper foil layer has a thickness of 25 to 50 microns and has pores in the size of 5 to 20 micrometers in diameter; and the porous copper foil layer is formed with chemical etching; and
- wherein outer boundary of the porous copper foil layer is embedded in a copper gasket configured to function as an electric conductor and the copper gasket is further configured to increase durability of the electrochemical antimicrobial face mask.

17. The method of claim 10, wherein forming the hydrophilic antimicrobial membrane comprises:
- providing a hydrophilic membrane made of a spun bond 65% polyester and 35% viscose nonwoven; or
- providing a hydrophilic membrane made of a spun bond 65% polyester and 35% cotton nonwoven.

18. The method of claim 10, wherein forming the filtration section further comprises:
- forming a pocket to hold the electrochemical antimicrobial section of the electrochemical antimicrobial face mask.

* * * * *